United States Patent
Windl et al.

(10) Patent No.: US 7,475,930 B2
(45) Date of Patent: Jan. 13, 2009

(54) INTERIOR COMPONENTS OF MOTOR VEHICLES

(75) Inventors: Michael Windl, Landshut (DE); Robert Pusl, Moosburg (DE); Max Bubenhofer, Dingolfing (DE)

(73) Assignee: Lisa Dräxlmaier GmbH (DE)

( * ) Notice: Subject to any disclaimer, the term of this patent is extended or adjusted under 35 U.S.C. 154(b) by 0 days.

(21) Appl. No.: 11/394,377

(22) Filed: Mar. 30, 2006

(65) Prior Publication Data

US 2006/0237981 A1 Oct. 26, 2006

(30) Foreign Application Priority Data

Apr. 1, 2004 (DE) .................. 10 2005 015 124

(51) Int. Cl.
*B60R 7/04* (2006.01)
(52) U.S. Cl. .................. 296/24.34; 296/37.8; 296/37.14
(58) Field of Classification Search ................ 296/37.7, 296/37.8, 37.12, 37.14, 37.15, 24.34, 37.1
See application file for complete search history.

(56) References Cited

U.S. PATENT DOCUMENTS

| | | | | |
|---|---|---|---|---|
| 3,408,705 | A * | 11/1968 | Kayser et al. ................. | 24/452 |
| 4,512,503 | A * | 4/1985 | Gioso ......................... | 224/539 |
| 4,846,382 | A * | 7/1989 | Foultner et al. .............. | 224/483 |
| 5,085,481 | A * | 2/1992 | Fluharty et al. ............ | 296/37.8 |
| 5,505,358 | A * | 4/1996 | Haase ......................... | 224/539 |
| 5,609,382 | A * | 3/1997 | Schmid et al. ............. | 296/37.8 |
| 5,660,310 | A * | 8/1997 | LeGrow ...................... | 224/275 |
| 5,667,896 | A * | 9/1997 | Carter et al. ............. | 428/425.6 |
| 6,019,411 | A * | 2/2000 | Carter et al. ................ | 296/37.7 |
| 6,135,528 | A * | 10/2000 | Sobieski et al. ............ | 296/37.7 |
| 6,135,529 | A * | 10/2000 | De Angelis et al. ........ | 296/37.8 |
| 6,203,088 | B1 * | 3/2001 | Fernandez et al. ......... | 296/37.8 |
| 6,231,111 | B1 * | 5/2001 | Carter et al. ............ | 296/146.15 |
| 6,338,517 | B1 * | 1/2002 | Canni et al. ................ | 296/37.8 |
| 6,394,526 | B1 * | 5/2002 | Gyllenspetz ................ | 296/70 |
| 6,490,788 | B2 * | 12/2002 | Carter et al. ................ | 29/854 |
| 6,575,528 | B2 * | 6/2003 | Tiesler et al. .............. | 296/214 |
| 6,655,561 | B2 * | 12/2003 | Panhelleux et al. ........ | 224/275 |
| 6,752,444 | B2 * | 6/2004 | Kitano et al. ............. | 296/184.1 |
| 6,921,118 | B2 * | 7/2005 | Clark et al. .............. | 296/24.34 |
| 7,029,048 | B1 * | 4/2006 | Hicks et al. .............. | 296/24.34 |

(Continued)

FOREIGN PATENT DOCUMENTS

DE 4444817 A1 6/1996

(Continued)

*Primary Examiner*—Glenn Dayoan
*Assistant Examiner*—Gregory Blankenship
(74) *Attorney, Agent, or Firm*—Wolf Greenfield & Sacks, P.C.

(57) ABSTRACT

An interior component for a motor vehicle is fixed to the vehicle by way of protrusions to reduce movement in a plane and by way of a tool-free fastener to reduce movement in a direction perpendicular to the plane. The tool-free fastener may Velcro® fastener. The tool-free fastener may allow slight movement along the plane during assembly and may prevent such movement by pressing the two complementary portions of the tool-free fastener toward each other. Employing such a tool-free fastener reduces assembly time. Because the tool-free fastener need not be accessible to tools, the fixation point may be placed at a location ideally suited for load-bearing.

8 Claims, 3 Drawing Sheets

U.S. PATENT DOCUMENTS

| | | | |
|---|---|---|---|
| 7,044,834 B2 * | 5/2006 | Chesley et al. | 451/28 |
| 7,111,883 B1 * | 9/2006 | Patel et al. | 296/24.34 |
| 7,137,659 B2 * | 11/2006 | Tiesler et al. | 296/37.8 |
| 7,156,438 B2 * | 1/2007 | Cowelchuk et al. | 296/24.34 |
| 7,186,118 B2 * | 3/2007 | Hansen et al. | 439/34 |
| 7,188,396 B2 * | 3/2007 | Melbye et al. | 24/452 |
| 7,222,906 B2 * | 5/2007 | Sakakibara et al. | 296/24.34 |

FOREIGN PATENT DOCUMENTS

| | | |
|---|---|---|
| DE | 10022478 A1 | 3/2001 |
| DE | 10043656 A1 | 3/2002 |
| EP | 0 047 858 A1 | 8/1981 |
| EP | 0047858 A1 | 3/1982 |

* cited by examiner

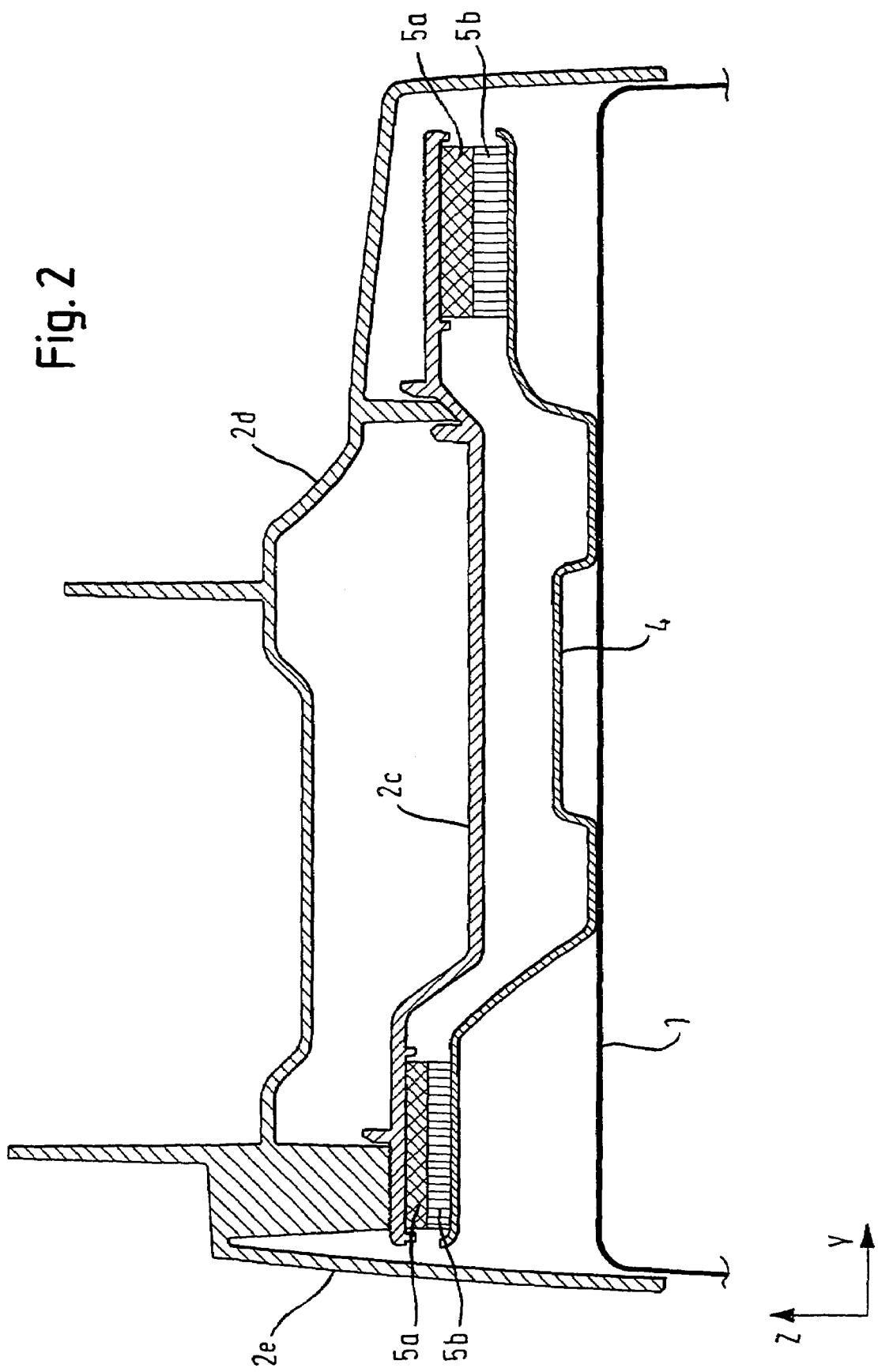

INTERIOR COMPONENTS OF MOTOR VEHICLES

BACKGROUND

1. Field

Aspects of the invention relate to interior components of motor vehicles, and in particular to mounting arrangements for such interior components.

2. Discussion of Related Art

Various components used in vehicle interiors, such as center consoles, instrument panels and the like, are currently attached to the vehicle body with screws. Centering elements may also be employed to position the component in the desired location. EP 0 047 858 discloses an instrument panel braced by suitably positioned set screws that also act to compensate for tolerances.

Such prior interior components and the associated attachment arrangements, however, often result in decreased manufacturing and/or assembly efficiencies. Further, the design of the components are often compromised in order to allow for a suitable assembly arrangement. For example, screw positions are often chosen based on accessibility by the appropriate assembly tools rather that the ideal load-bearing location. Moreover, attachment and positioning with the use of screws and centering elements provides little margin to compensate for tolerances. This is largely due to the fact that the positions of the screw holes and the centering elements are fixed at the time of production of the interior component and the vehicle body. The resulting precision required for assembly, coupled with the need for assembly tools, prevents an increase in assembling efficiency. In addition, screw holes located in the interior component must be covered with suitable face plates for aesthetic purposes, resulting in additional assembly time and increased inventory of ancillary components.

SUMMARY

In one illustrative embodiment, an interior component for the interior of vehicles that is fixed to the vehicle or to a support element connected to the vehicle is provided. The component is positionable in an x-y plane by means of protrusions and is fixable in a z-direction direction that is perpendicular to the x-y plane by means of Velcro® fasteners. The Velcro® fasteners are formed such that the component is displaceable in the x-y-plane when the Velcro® fasteners lie upon another, and are fixable by pressing in the z-direction.

In another illustrative embodiment, an interior component for an interior of a motor vehicle is provided. The component includes a body having a mounting location. The body is positionable in a plane relative to the vehicle. A position locator cooperates with the body and is constructed and arranged to at least initially locate the body relative to the vehicle in the plane. A tool-free fastener cooperates with the body and is located at the mounting location. The tool-free fastener is adapted to mount the body to the vehicle to secure the body in a direction that is generally perpendicular to the plane.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which:

FIG. 2 is a cross-section of the center console taken along line II-II of FIG. 1.

DETAILED DESCRIPTION

Figure 1:
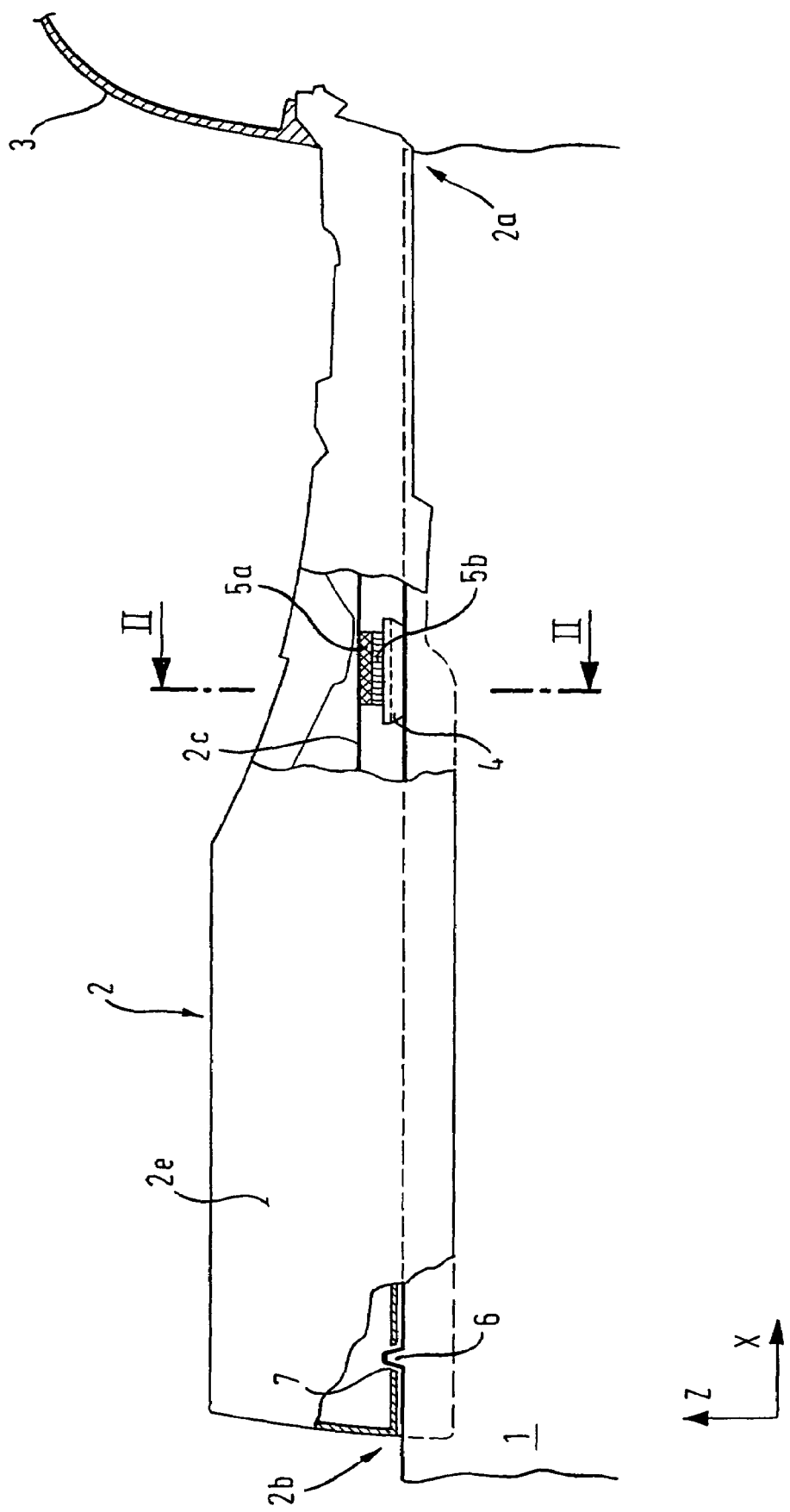
FIG. 1 is a side view of a center console for the interior of motor vehicles.

Aspects of the invention are directed to interior components for the interior of motor vehicles that are relatively simple to install as compared to conventional interior components. To assemble the component to the vehicle, a tool-free fastener is provided. In one embodiment, the tool-free fastener is a Velcro® brand fastener (available from Velcro USA Inc., Manchester, N.H., USA). Other suitable tool-free fasteners, including hoop-and-loop fasteners, may be employed, as the present invention is not limited in this respect.

In one embodiment, an arrangement for locating the component in a plane is provided and the tool-free fastener is employed to hold the component in a direction that is generally perpendicular to the plane. For example, in one embodiment, the component is positionable in an x-y plane by way of protrusions and is fixable in a direction perpendicular thereto (e.g., in a z-direction) by way of the tool-free fastener. In this manner, the component may be displaceable in the x-y plane when the mating components of the tool-free fastener overlie one another and are fixable by pressing in the z-direction.

In one embodiment, the tool-free fastener is releasable, enabling repositioning of the component during assembly or thereafter as desired. Further, in one embodiment the tool-free fastener includes complementary halves or portions, with each having a round-headed structure. In another embodiment, the fastener includes a mushroom-headed structure. Therefore, when placing the two mating portions upon another, the connection is not immediately established. In this manner, the component may be moved, adjusted or repositioned in the x-y plane within certain limits so that the component may be placed in a desired location. Once the location is satisfactory, the fasteners are secured by pressing the two fastener portions together in the z-direction.

The positioning elements may be formed in any suitable manner as the present invention is not limited in this respect. In one embodiment, the positioning elements may be formed as protrusions and in one embodiment, as positioning pins.

With the use of a tool-free fastener, the mounting location may be chosen based on structural considerations, rather than based on accessibility with a tool. That is, the fastening points can be placed at locations ideally suited for load-bearing. Further, such a location may be determined at time of assembly and pre-determined mounting locations need not necessarily be utilized. The assembly space saved immediately above the fastener may be used for other purposes, rather than accommodating a tool.

The mating portions of the tool-free fastener may be joined to the their respective mounting locations (e.g., the component and the vehicle body) by any suitable arrangement, as the present invention is not limited in this respect. In one embodiment, the mating portions are mounted by gluing, clipping, stapling, welding or in any other suitable manner. Such a mounting will aid in allowing the tool-free fastener to be mounted at any desired location on the component and/or vehicle body. Of course, the present invention is not limited in this regard, as the mounting arrangement need facilitate such variability with mounting locations.

The component may be attached directly to the vehicle body (for example on the floor plate) or via a support element connected thereto, as the present invention is not limited in this respect. In one embodiment, the component is a center console for the interior of a vehicle. In one embodiment, the protrusions disposed on the center console are formed by the wall portions of the center console. It should be appreciated that the component may be any interior component of the motor vehicle, such as the instrument panel, dash panel, trim pieces, etc., as the present invention is not limited in this respect.

Turning now to the Figures and in particular to FIG. 1, a lateral view of a component, such as a center console 2 is shown. The center console lies on a floor plate 1 of the bodywork of the vehicle and is attached thereto as will be discussed below. In the illustrative embodiment shown, the front end 2a of the center console is inserted into an instrument panel 3.

Center console 2, shown in the cross-sectional view of FIG. 2, in one embodiment is formed substantially by a floor 2c, a support 2d, and outer walls 2e. Referring to FIG. 1, in one illustrative embodiment, positioning pins 6 are mounted on the floor plate 1 and serve to position the center console on the floor plate 1 (only one positioning pin 6 is shown in FIG. 1), for example in a plane, such as in an x-y plane. The positioning pins 6 engage with corresponding recesses 7 on the inner side of the outer wall 2e and/or on the floor 2c of the center console to prevent or reduce the likelihood of the console 2 shifting upon assembly. Further, the positioning pins, in one embodiment, cooperate with the tool-free fastener, which as explained serves to anchor the center console on the floor plate 1. Although only one positioning pin is shown, any suitable number positioning pins may be employed, as the present invention is not limited in this respect. Thus, in addition to or instead of the positioning pins at the rear end 2b of the center console, as shown, positioning pins may be employed at the front end 2a or at other suitably chosen locations. Also, it should be appreciated that although the positioning pin is provided on the motor vehicle, the positioning pins may be disposed on the center console and the recesses may be provided on the floor plate 1. Further, positioning pins may be provided on both the console and on the vehicle, respectively, with corresponding recesses formed on the vehicle and the console, respectively.

In one embodiment, one or more tool-free fasteners, such as the illustrated Velcro® brand fasteners, are mounted on both sides of the longitudinal axis of the center console from below to its bottom 2c close to the outer wall 2e. In this embodiment, the location is chosen where the maximum load-bearing occurs (e.g., in one embodiment, approximately half-way between the front end 2a and the rear end 2b). In one embodiment, pad 5b of the tool-free fastener is complementary to pad 5a of the tool-free fastener and both are mounted in corresponding opposite positions on a support bracket 4 fixedly connected to the floor plate 1. In one embodiment, the pads are glued to the floor 2c and to the floor plate 1, respectively, with an adhesive. In one embodiment, the adhesive is heat resistant up to 100° C.

Figure 3A:
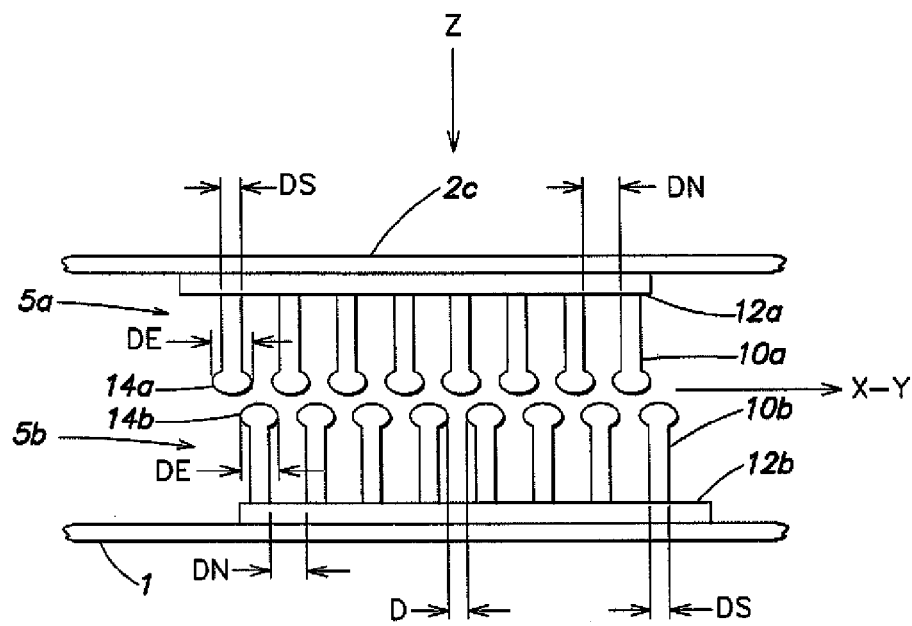
FIGS. 3A and 3B are schematic representations of one embodiment of a tool-free fastener.
Figure 3B:
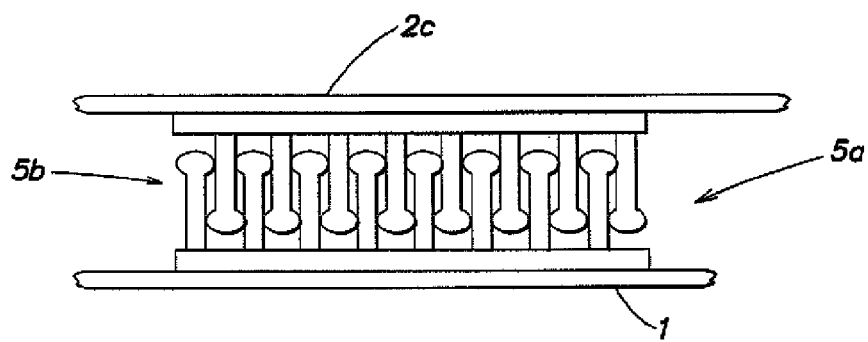

The tool-free fastener may be constructed in a manner whereby, upon each portion coming to lie one upon another, they can still be displaced in the plane defined by the mating interface, which may be referred to as the x-y direction or along the x-y plane, but that they will engage fixedly with one another as soon as pressure is exerted in the direction of overlap, that is, in a direction (e.g., z-direction) that is perpendicular to the interface. This characteristic may be achieved by employing any suitable structure, as the present invention is not limited in this respect. In one embodiment, this characteristic may be provided with a tool-free fastener, such as a Velcro® brand fastener formed with a round-headed or mushroom-headed structure. In one embodiment, as shown in FIGS. 3A and 3B, each portion (5a, 5b) of the fastener includes a plurality of substantially equal-length and substantially equidistant stems 10 protruding perpendicularly from a base surface 12. The free ends 14 of the stems have a generally spherical form. The diameter of the spheres (DE) is larger than the diameter of the stems (DS) and larger than the smallest distance between neighboring sphere surfaces (D). The sphere diameter, in one embodiment, can be slightly smaller, substantially the same, or slightly larger than the distance (DN) between neighboring stems. In this manner, when the pads 5a and 5b overlie each other, they are able to move relative to each other along the x-y plane (see FIG. 3A). When pressed together in the z direction, the corresponding stems and spheres engage each other (see FIG. 3B) to secure against movement.

It should be appreciated that various combinations of the above-described embodiments can be employed together, but several aspects of the invention are not limited in this respect. Therefore, although the specific embodiments disclosed in the figures and described in detail employ particular combinations of features, it should be appreciated that the present invention is not limited in this respect, as the various aspects of the present invention can be employed separately, or in different combinations. Thus, the particular embodiments described in detail are provided for illustrative purposes only.

It should also be appreciated that a variety of features employed in the art of vehicle manufacture may be used in combination with or to modify the above-described features and embodiments.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention, as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A motor vehicle comprising:
   a vehicle body having a protrusion formed thereon; and
   an interior component mountable to the vehicle body, the interior component comprising:
   a component body having a mounting locator, the component body positionable in a plane relative to the vehicle body, the component body having an opening constructed and arranged to mate with the protrusion formed on the vehicle body; and a tool-free fastener cooperating with the component body and the vehicle body and located at the mounting location, the tool-free fastener adapted to mount the body to the vehicle to secure the body in a direction that is generally perpendicular to the plane.

2. The motor vehicle according to claim 1, wherein the tool-free fastener comprises a first portion glued to the body.

3. The motor vehicle according to claim 2, wherein the tool-free fastener comprises a second portion glued to the vehicle.

4. The motor vehicle according to claim 1, wherein the tool-free fastener comprises a round-headed structure.

5. The motor vehicle according to claim 1, wherein the tool-free fastener comprises a mushroom-headed structure.

6. The motor vehicle according to claim 1, wherein the interior component is a center console.

7. The motor vehicle according to claim 1, wherein the tool-free fastener comprises a first portion, with the first portion comprising a plurality of substantially equal-length and substantially equidistant stems extending substantially perpendicularly from a base surface, a free-end of each stem having a generally spherical form.

8. The motor vehicle according to claim 1, wherein the tool-free fastener comprises a second portion adapted to mate with the first portion, wherein the second portion comprising a plurality of substantially equal-length and substantially equidistant second stems extending substantially perpendicularly from a second base surface, each second stem having a stem diameter, a free-end of each second stem having a generally spherical form, wherein a diameter of the generally spherical free-end of each first stem is larger than the diameter of each second stem and larger than the smallest distance between neighboring free-ends of each second stem.

* * * * *